(12) United States Patent
Kim

(10) Patent No.: US 11,303,103 B2
(45) Date of Patent: *Apr. 12, 2022

(54) FLEXIBLE COVER FOR WIRES OR CABLES

(71) Applicant: Dale Kim, Redondo Beach, CA (US)

(72) Inventor: Dale Kim, Redondo Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/988,083

(22) Filed: Aug. 7, 2020

(65) Prior Publication Data

US 2021/0021114 A1 Jan. 21, 2021

Related U.S. Application Data

(63) Continuation of application No. 15/777,296, filed as application No. PCT/US2016/063114 on Nov. 21, 2016, now Pat. No. 10,770,874.

(60) Provisional application No. 62/257,362, filed on Nov. 19, 2015.

(51) Int. Cl.
*H02G 3/04* (2006.01)

(52) U.S. Cl.
CPC ......... *H02G 3/0456* (2013.01); *H02G 3/0481* (2013.01); *Y10T 428/24744* (2015.01)

(58) Field of Classification Search
CPC .............. H02G 3/0456; H02G 3/0481; Y10T 428/24744
See application file for complete search history.

(56) References Cited

U.S. PATENT DOCUMENTS

| | | | |
|---|---|---|---|
| 2,334,712 A | 11/1943 | Kispert | |
| 4,836,080 A | 6/1989 | Kite, III et al. | |
| 5,901,756 A | 5/1999 | Goodrich | |
| 6,192,967 B1 | 2/2001 | Huang | |
| 6,309,721 B1* | 10/2001 | Gladfelter | B60R 13/08 428/298.1 |
| 6,545,219 B1* | 4/2003 | Bukovnik | H02G 15/18 174/74 A |
| 2002/0117273 A1 | 8/2002 | Huang | |
| 2003/0094250 A1 | 5/2003 | Huang | |
| 2004/0007336 A1 | 1/2004 | Huang | |
| 2004/0099426 A1 | 5/2004 | Bryl et al. | |
| 2004/0123961 A1 | 7/2004 | Huang | |
| 2004/0219846 A1* | 11/2004 | Sellis | F16L 59/029 442/46 |
| 2004/0250968 A1 | 12/2004 | Huang | |
| 2007/0210490 A1 | 9/2007 | Malloy et al. | |

(Continued)

FOREIGN PATENT DOCUMENTS

GB 438751 11/1935

OTHER PUBLICATIONS

PCT International Search Report and Written Opinion dated Feb. 15, 2017 issued in PCT/US2016/063114.

(Continued)

*Primary Examiner* — David Sample
*Assistant Examiner* — Donald M Flores, Jr.
(74) *Attorney, Agent, or Firm* — Ked & Associates LLP

(57) ABSTRACT

A flexible covering for wires, cables, and the like includes a flexible sleeve in a partially rolled natural state and capable of being unrolled, and at least one pliable rod or insert running through an entire length of the flexible sleeve capable of firmly holding the flexible sleeve in a bent shape while allowing the flexible sleeve to remain wrapped around a bundle of wires.

19 Claims, 3 Drawing Sheets

(56) References Cited

U.S. PATENT DOCUMENTS

2014/0174585 A1   6/2014  Itoh
2014/0220846 A1   8/2014  Woodruff et al.

OTHER PUBLICATIONS

European Search Report dated Apr. 1, 2019 issued in EP Application No. 16867336.6.

* cited by examiner (a)

(b)

(a)

(b)

(a)

(b)

FLEXIBLE COVER FOR WIRES OR CABLES

CROSS-REFERENCE TO RELATED APPLICATIONS

This application is a Continuation Application of prior U.S. patent application Ser. No. 15/777,296 filed May 18, 2018, which is a U.S. National Stage Application under 35 U.S.C. § 371 of PCT Application No. PCT/US2016/063114, filed Nov. 21, 2016, which claims priority to U.S. Provisional Application No. 62/257,362, filed Nov. 19, 2015, whose entire disclosures are hereby incorporated by reference.

BACKGROUND

1. Field

The present disclosure relates to a flexible covering or sleeve for wires or cables.

2. Background

Various forms of coupling and bundling wires and cables together are known in the art, such as tape, twist ties, zip strips, and other pliable coverings. However, shortcomings with each of these tools exist, such as difficulty in adding or subtracting cables or wires from the bundle. Further, the bundle of wires may not be easily manipulated into convenient flexible and fixed positions to reduce clutter or effectively package the bundle in a certain space.

BRIEF DESCRIPTION OF THE DRAWINGS

The embodiments will be described in detail with reference to the following drawings in which like reference numerals refer to like elements wherein.

DETAILED DESCRIPTION

A flexible covering or sleeve is described which may partially overlap itself to wrap around a single or multiple wires, cables, rods, or similar objects. Once the objects are wrapped, a user may then bend the covering containing the objects to a predetermined degree as needed for a particular application, at which point the covering may firmly hold the objects in the bent state using one or more pliable rods or wires running through the covering.

Figure 1:
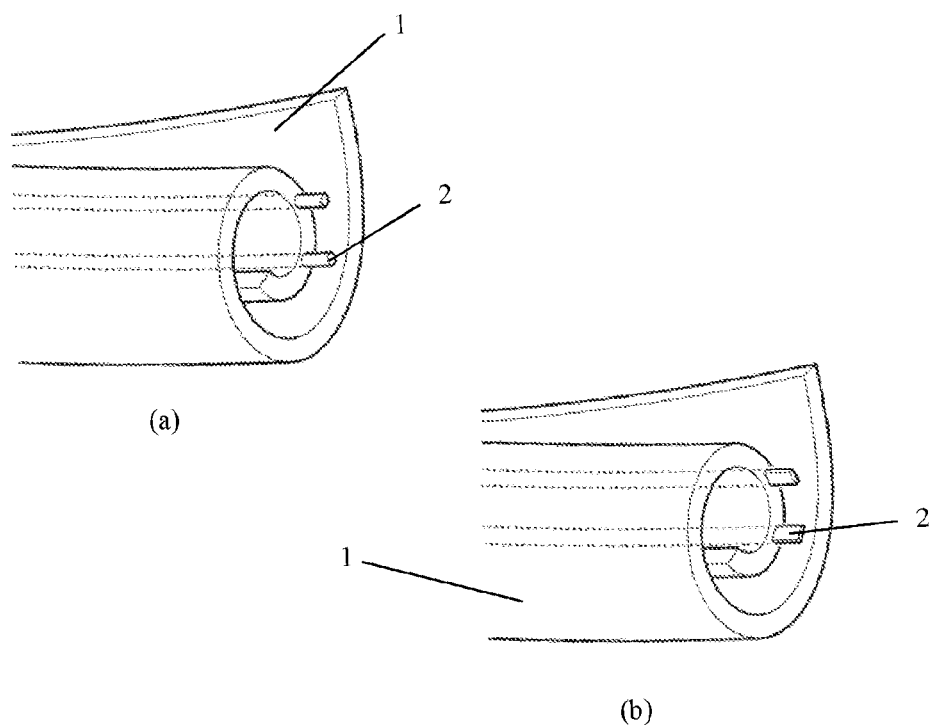
FIG. 1 is a perspective view illustrating (a) an example of inner wires running through a sleeve, and (b) another example of wires running through the sleeve.

As illustrated in FIG. 1, a covering or sleeve 1 may have a rolled shape capable of encasing or wrapping a grouping of wires or cables. The covering 1 may be made of a flexible rubber, plastic, silicone or other pliable solid material, which may be non-conducting. The covering 1 may have a certain rigidity to hold a partially rolled form so that edges overlap in a natural state, and may be temporarily unwrapped to insert one or more wires or cables. Once the one or more wires or cables are inserted, the together. The covering 1 may not need a separate fastening means to enclose the covering 1 in a rolled state.

One or more pliable rods or shafts 2 may be inserted into and run through the length of the covering 1. The rods 2 may be made of pliable metal, but the material is not limited thereto. The rods 2 may be oriented parallel to each other, and may be parallel to edges of the covering 1 or may be oriented to a predetermined degree with respect to the edges of the covering 1.

Once the one or more wires or cables are inserted, the user may bend the covering 1 to a predetermined degree. The pliable rods 2 may hold the covering in the bent position. The covering 1 may be rigid enough to keep the one or more wires or cables enclosed within the covering 1 even when the covering 1 is in the bent position.

The covering 1 may be electrically insulating and may have low thermal conductivity, i.e., high thermal resistance. The rods 2, which may be flat or rounded, may be embedded inside the covering 1, or in between two layers of the covering material to keep them enclosed. Although only two rods are shown, additional rods may be provided. The rods 2 may also have any cross section to allow for the covering 1 to be maintained in a bent state. Further, a thin sheet or multiple inner wires, rods, or sheets may be used, which may be solid or mesh like.

The covering 1 may allow users to cover or bundle single or multiple wires, cables, cordage, and other similar type objects together and bend them. The rods 2, sheets, or mesh may be embedded in the covering material and may allow the covering 1 to be bendable and hold the position in a wide range of angles. The metal rods 2, sheets, or mesh may have sufficient structural rigidity to allow the covering 1 to maintain its angled shape after bending.

Figure 2:
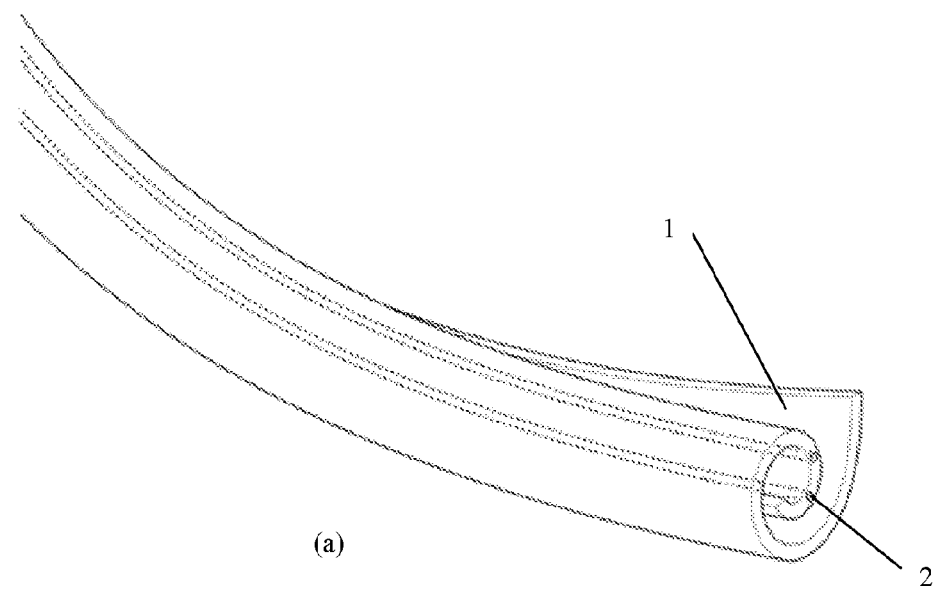
FIG. 2 is a perspective view illustrating (a) an elongated version of the sleeve, and (b) another example of the sleeve.
Figure 2:
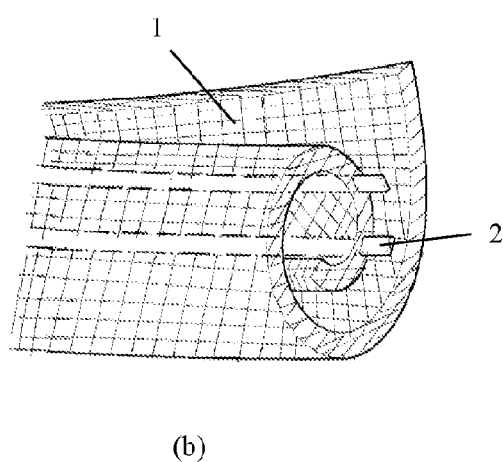

As illustrated in FIG. 2, the covering 1 may be manufactured in pre measured lengths, and may further be cut to size depending on usage requirements. The ends of the pre-cut sections may be enclosed so the inner reinforcing rod 2, mesh, or sheet is not exposed. Although metal material may be generally used for the rods 2, other types of pliable materials may be used as long as the materials maintain sufficient rigidity after bending into a prescribed shape.

The covering 1 may also be manufactured in a multitude of sizes. For example, the covering 1 may be used in multiple applications, such as a home or office, an automobile, general building construction, or suspended telephone cables. Additional rods 2 may be inserted as necessary to ensure stability when a bending is applied to the covering 1. The additional rods 2 may be inserted at any angle with respect to the first rods 2.

Although the attached figures illustrate the covering 1 being wound around, the covering 1 may be provided where it is partially wound around a bundle of wires. In an alternative embodiment, the covering 1 may have a pattern, as shown in FIG. 2, or may be part of the pattern. Although the wires are shown in the figures to be embedded, the wires may be provided on an external surface of the cover. The covering 1 may also be a pliable mesh type, which may allow for bending and stability without the need for additional rods 2 to be inserted through the covering 1.

Figure 3:
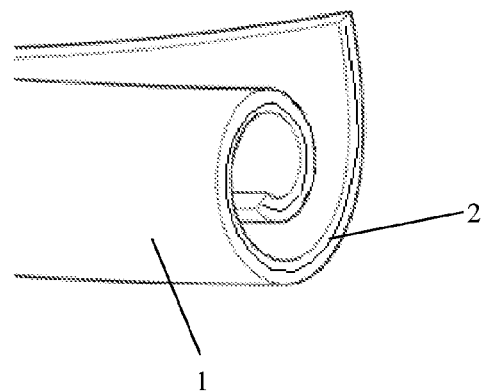
FIG. 3 is a perspective view illustrating (a) an embodiment of a mesh type insert, and (b) an example of the mesh structure.]
Figure 3:
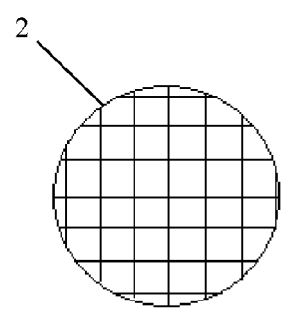

As illustrated in FIG. 3, the insert 2 may be a pliable mesh type that runs through an entire length of the covering 1. The mesh insert 2 may also run through an entire width of the covering 1 in order to improve rigidity. The mesh insert 2 may also only run through a portion of the covering 1 in order to reduce material usage.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flexible covering comprising:
   a flexible wrap having a first edge and a second edge that extend between first and second ends along a first direction; and
   at least one pliable layer coupled to the flexible wrap,
   wherein the flexible wrap has a first rigidity such that the flexible wrap is configured to:
      be in a rolled state in which the first edge of the flexible wrap overlaps the second edge of the flexible wrap when a first force is not applied to at least one of the first edge or second edge
      be moved to an unrolled state in which the first edge of the flexible wrap does not overlap the second edge of the flexible wrap when the first force is applied to at least one of the first edge or second edge, and
      be placed into a bent state in which the first end is moved relative to the second end when a second force is applied in a second direction that differs from the first direction, and
   wherein the at least one pliable layer has a second rigidity that is greater than the first rigidity of the flexible wrap such that the at least one pliable layer is configured to maintain the flexible wrap in the bent state after the second force is removed, and
   wherein the at least one pliable layer includes at least one first layer that extends in a third direction, and at least one second layer that extends in a fourth direction that intersects the third direction.

2. The flexible covering of claim 1, wherein the at least one pliable layer includes at least one rod.

3. The flexible wrap of claim 2, wherein the at least one rod runs through the flexible wrap in a third direction that is diagonal to the first and second directions.

4. The flexible covering of claim 2, wherein the at least one rod includes a rod running through an entire length of the flexible wrap.

5. The flexible covering of claim 4, wherein the at least one rod includes two or more rods arranged in parallel through the entire length of the flexible wrap.

6. The flexible covering of claim 1, wherein the at least one pliable layer includes a metal.

7. The flexible covering of claim 1, wherein the flexible wrap includes a non-conducting rubber.

8. The flexible covering of claim 1, wherein the flexible wrap includes a mesh type material.

9. The flexible covering of claim 8, wherein the mesh type material runs through a portion of the flexible wrap.

10. The flexible covering of claim 1, wherein the at least one pliable layer is embedded in the flexible wrap.

11. The flexible covering of claim 10, wherein the at least one pliable insert layer is provided between a first portion of the flexible wrap and the second portion of the flexible wrap, the first portion and the second portion of the flexible wrap being coupled together.

12. The flexible covering of claim 1, wherein the at least one pliable layer is provided at a surface of the flexible wrap.

13. The flexible covering of claim 1, wherein:
    the flexible wrap is moved from the rolled state to the unrolled state to receive an object when the first force is applied,
    the flexible wrap returns to the rolled state from the unrolled state when the first force is removed to at least partially enclose the object, and
    the object, when received in the flexible wrap, is maintained in the bent state after the second force is removed based on the pliable layer maintaining the flexible wrap in the bent state after the second force is removed.

14. The flexible covering of claim 13, wherein the object is less rigid than the at least one pliable layer.

15. A flexible covering comprising:
    a flexible wrap having a prescribed length between first and second ends in a first direction, wherein a first edge of the flexible wrap overlaps a second edge of the flexible wrap in a first state; and
    at least one pliable layer embedded within the flexible wrap, the pliable layer being more rigid than the flexible wrap,
    wherein the pliable layer is configured to maintain the flexible wrap in a bent state when the flexible wrap is folded in a second direction different from and perpendicular to the first direction,
    wherein the flexible wrap is capable of being unrolled into a second state,
    wherein the at least one pliable layer includes a rod running along the flexible wrap, and
    wherein the at least one pliable rod includes a pliable mesh sheet that runs through the entire flexible wrap.

16. The flexible wrap of claim 15, wherein the at least one pliable rod runs diagonally through the entire length of the flexible wrap.

17. The flexible covering of claim 15, wherein the rod includes two or more pliable rods arranged in parallel through the entire length of the flexible wrap.

18. The flexible covering of claim 15, wherein the flexible wrap is made of a non-conducting rubber.

19. The flexible covering of claim 15, wherein the flexible wrap is made of a mesh type material.

* * * * *